US008024802B1

(12) United States Patent
Preston

(10) Patent No.: US 8,024,802 B1
(45) Date of Patent: Sep. 20, 2011

(54) METHODS AND SYSTEMS FOR USING STATE RANGES FOR PROCESSING REGULAR EXPRESSIONS IN INTRUSION-PREVENTION SYSTEMS

(75) Inventor: Jason D. Preston, Austin, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 534 days.

(21) Appl. No.: 12/182,262

(22) Filed: Jul. 30, 2008

Related U.S. Application Data

(60) Provisional application No. 60/953,099, filed on Jul. 31, 2007.

(51) Int. Cl.
*G06F 11/00* (2006.01)

(52) U.S. Cl. .......................................... 726/22; 726/23

(58) Field of Classification Search .................. 726/11, 726/22–26; 713/153–154, 160, 166, 188; 709/223–224, 229
See application file for complete search history.

(56) References Cited

U.S. PATENT DOCUMENTS

| | | | |
|---|---|---|---|
| 6,499,107 B1 * | 12/2002 | Gleichauf et al. ............ | 726/23 |
| 7,134,143 B2 | 11/2006 | Stellenberg et al. | |
| 7,216,364 B2 * | 5/2007 | Zhao et al. ....................... | 726/22 |
| 7,246,156 B2 * | 7/2007 | Ginter et al. .................. | 709/217 |
| 7,818,564 B2 | 10/2010 | Loughran et al. | |
| 2008/0059464 A1 | 3/2008 | Law et al. | |
| 2008/0101371 A1 | 5/2008 | Law et al. | |

* cited by examiner

*Primary Examiner* — Hosuk Song

(57) ABSTRACT

Methods and systems are provided for using state ranges for processing regular expressions in intrusion-prevention systems. In an embodiment, in an intrusion-prevention system for examining network traffic and identifying therein the presence of signature data patterns, a state-transition table is provided. The state-transition table is representative of a predetermined data pattern, and includes states each having one or more egress events defining transitions to other states. A subject is received for evaluation for the presence of the predetermined data pattern. While using the state-transition table for said evaluation, the presence of a first egress event of a first state is detected in the subject, resulting in a transition from the first state to a second state. A second-state range in the subject is calculated, and the second-state range is searched for the presence of at least one of the second state's egress events.

20 Claims, 12 Drawing Sheets

REGEX =^([+-]?[0-9]+(\.[0-9]*)?)[CF]$

FIG. 2A  A  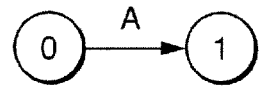
FIG. 2B  AB  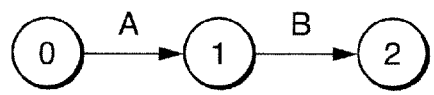
FIG. 2C  A/B  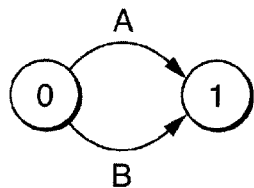
FIG. 2D  A?  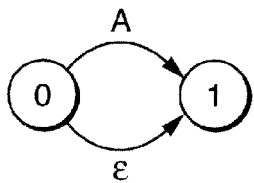
FIG. 2E  A+  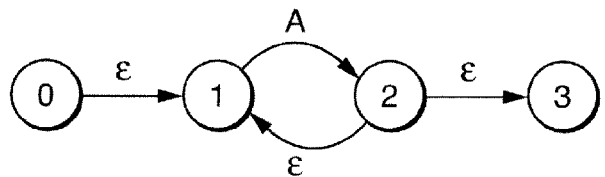
FIG. 2F  A*  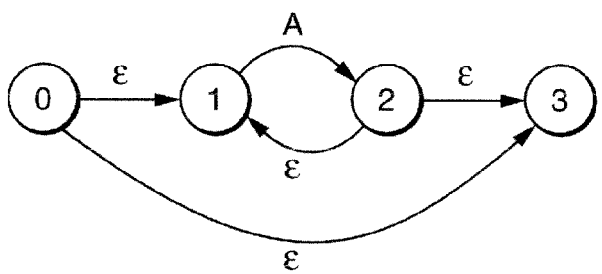

A{x}

A{0,y}

A{x,y} = A{x}A{0,(y-x)}

Regex = .*[0-9]555

THE FORMAT FOR THE TRACE DATA IS

STATE Dx{Dx.count} from Dy at pos z:
[Dx.checkedState,Dx.checkedEnd] <optional result>

Ex 1:

subject = abcd12345678123455678efgh

State D0{1} from D0 at pos 0: [0,26]
State D1{1} from D0 at pos 5: [5,22] MATCH in D2

Ex 2:

subject = absd12345678a123555678efgh

State D0{1} from D0 at pos 0: [0,27]
State D1{1} from D0 at pos 5: [5,12]
State D1{1} from D0 at pos 14: [14,23] MATCH in D2

METHODS AND SYSTEMS FOR USING STATE RANGES FOR PROCESSING REGULAR EXPRESSIONS IN INTRUSION-PREVENTION SYSTEMS

RELATED APPLICATION

This application claims the benefit of U.S. Provisional Application No. 60/953,099 entitled "Methods and Systems for Using State Ranges for Processing Regular Expressions in Intrusion-Prevention Systems" filed Jul. 31, 2007, by Jason D. Preston.

BACKGROUND

1. Technical Field

The present invention relates to the processing of regular expressions, and, in particular, to improved state-diagram formations and state-transition processing.

2. Description of Related Art

Packet-data communication, such as communication over the Internet, is extremely popular, and is becoming more so every day. People and companies routinely use Internet-connected computers and networks to conduct their affairs. Myriad types of data are transmitted over the Internet, such as personal correspondence, medical information, financial information, business plans, etc. Unfortunately, not all uses of the Internet are benign; on the contrary, a significant percentage of the data that is transmitted over the Internet every day is malicious. Examples of this type of data are viruses, spyware, malware, worms, etc.

Not unexpectedly, an entire industry has developed to combat these vicious attempts to disrupt and harm Internet-based communications, along with the networks and computers used by those who engage in Internet-based communications. This industry, and the effort to fight these malicious threats generally, is often referred to as "intrusion prevention." One important aspect of intrusion prevention involves identifying known threats (files that are or contain viruses, worms, spyware, malware, etc.) by particular data patterns contained therein. These data patterns are sometimes referred to as "signatures" of the security threats.

As such, data (e.g. IP) packets flowing through, towards, or from a particular router, switch, network, etc. are often screened—perhaps by an intermediate device, functional component, or other entity sometimes referred to as a "bump in the wire"—for the presence of these signature data patterns. When particular packets, or sequences of packets, are identified as containing at least one of these signatures, those packets (or, again, sequences of packets) may be "quarantined," analogous to the way that people or animals having been identified as or suspected of carrying a particular disease would be, such that those packets cannot cause harm to any more networks and/or computers. These packets, removed from the normal flow of data traffic, can then be further analyzed without holding up that traffic generally.

It can thus be appreciated that it would be advantageous for a network device to be able to quickly and accurately identify these signature data patterns across one or more packets, and to do so in a way that uses relatively little in the way of computing resources such as processing time and memory.

These signature data patterns are often expressed using what is known as a "regular expression," which is an instance of a system of notation that can, fairly elegantly, represent complicated data patterns that, by their presence, may indicate a potential security threat. As a small example, a regular expression such as ".+[a]{5}[b]" may be used to represent a data pattern that could be stated as "one or more of (+) any type of character (.), followed by five consecutive 'a' characters ([a]{5}), followed by a 'b' character ([b])." Thus, the data being analyzed, often referred to as the "subject," would have to contain that data pattern at least once to be considered to match that regular expression, which often is also referred to as a "regex."

The screening for these particular data patterns is often implemented using a state machine, which is typically generated from a particular regex. Basically, the characters (e.g. "@") and character classes (e.g. "[0-9]," i.e. "any digit") in the regex define the transitions between states in the machine. A particular data subject, perhaps the payload of one or more packets, would then be evaluated using the state machine; this evaluation essentially involves starting in an initial state, and using the characters in the subject to try to transition through the state machine. If the right sequence of characters is present in the subject to cause the processing of the state machine to arrive at what is known as a "match state," then the subject is considered to match the regex that was used to generate the state machine, and the packet or packets that contained that subject may be quarantined for further analysis.

State machines are often also referred to as "automata," and are of one of two types: deterministic finite automata (DFA) (a deterministic state machine, a.k.a. a DFA state machine) or nondeterministic finite automata (NFA) (a nondeterministic state machine, a.k.a. an NFA state machine). In general, a DFA will have no ambiguity; that is, from a given state, a given character in the subject will result in either zero or one valid transitions to a next state. In contrast, an NFA will have ambiguity in that, from a given state, a given character can, and often does, match more than one transition to a next state. Thus, in an NFA, multiple paths through the state machine may be valid for the same subject.

In general, then, DFAs are typically faster and more straightforward to execute, but involve a higher number of states, while NFAs typically can be implemented with many fewer states, which uses far less memory, but are more complex to execute, since multiple valid paths through the state machine must be assessed. And DFAs and NFAs have other advantages and disadvantages in comparison with the other, in addition to those mentioned here.

Further with respect to regex processing, the popularity of the PERL scripting language has had a significant effect on the art of processing regular expressions. The PERL syntax incorporates regex processing with a powerful and popular regex feature set. The PERL regex syntax is the most widely used 'flavor' today, and regex engines are often referred to as being 'PERL compatible.' There is a FOSS (Free Open Source Software) project called PCRE (Perl Compatible Regular Expressions), which is a library in the C programming language for compiling and processing regular expressions using the PERL syntax and feature set. This library is used in existing Intrusion Prevention System (IPS) products.

PCRE works at least in part by converting a regex to an NFA state machine. Again, an NFA state machine is referred to as being non-deterministic because, in some states, there may be more than one valid transition out to respective next states. Using an NFA gives a lot of flexibility in terms of language syntax, but processing an NFA can require a lot of attempts to match on failed branches of the state machine. The process of backing up in to a prior state after a failed match attempt is called 'backtracking.' The conventions used in PCRE call for attempting to match as much text as possible, and backtracking if the match fails. For this reason, backtracking is common and performance suffers. Note that the type of search done using the PCRE engine is called a 'depth-first' search, because it tries the deepest paths through the NFA state machine first, and then backtracks to try other branches.

As also noted above, there is a different type of state machine, called a DFA state machine (or just DFA), which does not require backtracking. It is possible to convert an NFA to a DFA with some restrictions on syntax features (e.g., no backreferences). A DFA is more like a traditional state machine that is driven from state to state based on events (i.e. characters in the subject being searched). As noted above, DFAs are generally faster than NFAs, but usually have more states, and thus require more memory.

Recent versions of PCRE include an Application Program Interface (API) purporting to implement a DFA search, though PCRE does not generate a DFA in this case. Instead, these versions walk an NFA in a breadth-first manner. This process is, in essence, like generating a DFA on the fly, every time the search is performed. The results are the same, but the performance is very slow.

SUMMARY

Methods and systems are provided for using state ranges for processing regular expressions in intrusion-prevention systems. An exemplary method may be carried out in an intrusion-prevention system for examining network traffic and identifying therein the presence of signature data patterns. In accordance with the method, a state-transition table is provided. The state-transition table is representative of a predetermined data pattern, and comprises a plurality of states, each state having a set of egress events, each egress event defining a transition from a current state to a next state.

The state-transition table may be representative of a state diagram that itself is representative of the predetermined data pattern. The predetermined data pattern may be representative of a regular expression. Furthermore, each egress event may be either a character class or a character string.

Further in accordance with the exemplary method, a subject is received, where the subject is to be evaluated for the presence of the predetermined data pattern. The subject may comprise a payload of one or more packets, and the presence of the predetermined data pattern may be indicative of a potential security threat.

While using the state-transition table to evaluate the subject for the presence of the predetermined data pattern, the presence of a first egress event of a first state is detected in the subject. The first egress event defines a transition from the first state to a second state, and the presence of the first egress event in the subject results in transitioning from the first state to the second state. Transitioning from one state to another may involve recursively calling a state-search function.

Further in accordance with the exemplary method, a second-state range is calculated, where the second-state range is a range of positions in the subject in which to search for the presence of at least one of the second state's egress events. A cursor may correspond to a location in the subject that is currently being evaluated. Furthermore, the first state may have an associated first-state range in the subject. And calculating the second-state range may comprise setting a start of the second-state range equal to the cursor; and then, starting at the cursor, and extending no further than an end of the first-state range, determining that the subject includes a number of consecutive instances of the first egress event that end at a first position in the subject; and setting an end of the second-state range based on the first position. Furthermore, it may be determined that the second state does not have a character-class loop transition. In some embodiments, the first-state range may be calculated.

Alternatively, calculating the second-state range may comprise determining that the second state has a character-class loop transition; setting a start of the second-state range equal to the cursor; and then, starting at the cursor, determining that the subject includes a number of consecutive characters that satisfy the character-class loop transition and that end at a first position in the subject; and setting an end of the second-state range based on the first position.

In accordance with the exemplary method, the subject is then searched within the second-state range for the presence of at least one of the second state's egress events. This may involve sequentially searching the subject within the second-state range for the presence of each of the second state's egress events, and, when the presence of such an egress event is found, responsively transitioning from the second state to that egress event's next state. This transition may also involve recursively calling a state-search function.

The method may further comprise determining that none of the second state's egress events are present in the subject within the second-state range, and responsively returning to the first state. Upon returning to the first state, the cursor may be advanced to the end of the second-state range. The subject may then be searched after the advanced cursor and within the first-state range for the presence of at least one of the first state's egress events.

In another aspect, an exemplary embodiment may take the form of an intrusion-prevention network device for examining network traffic and identifying therein the presence of signature data patterns. The network device comprises a network interface, a processor, and data storage. The data storage comprises a state-transition table representative of a predetermined data pattern, the state-transition table comprising a plurality of states, each state having a set of egress events, each egress event defining a transition from a current state to a next state.

The data storage further comprises instructions executable by the processor to receive a subject to be evaluated for the presence of the predetermined data pattern; while using the state-transition table to evaluate the subject for the presence of the predetermined data pattern, detect in the subject the presence of a first egress event of a first state, the first egress event defining a transition from the first state to a second state, and responsively transition from the first state to the second state; calculate a second-state range, the second-state range being a range of positions in the subject in which to search for the presence of at least one of the second state's egress events; and search the subject within the second-state range for the presence of at least one of the second state's egress events. Note as well that some or all of the variations described above with respect to the method embodiments may also apply to the network-device embodiments, in any suitable combinations and permutations.

These as well as other aspects and advantages will become apparent to those of ordinary skill in the art by reading the following detailed description, with reference where appropriate to the accompanying drawings.

BRIEF DESCRIPTION OF THE DRAWINGS

FIGS. 2A-2F are state flow diagrams for terms in a regex.

DETAILED DESCRIPTION OF THE DRAWINGS

1. Introduction

Figure 1:
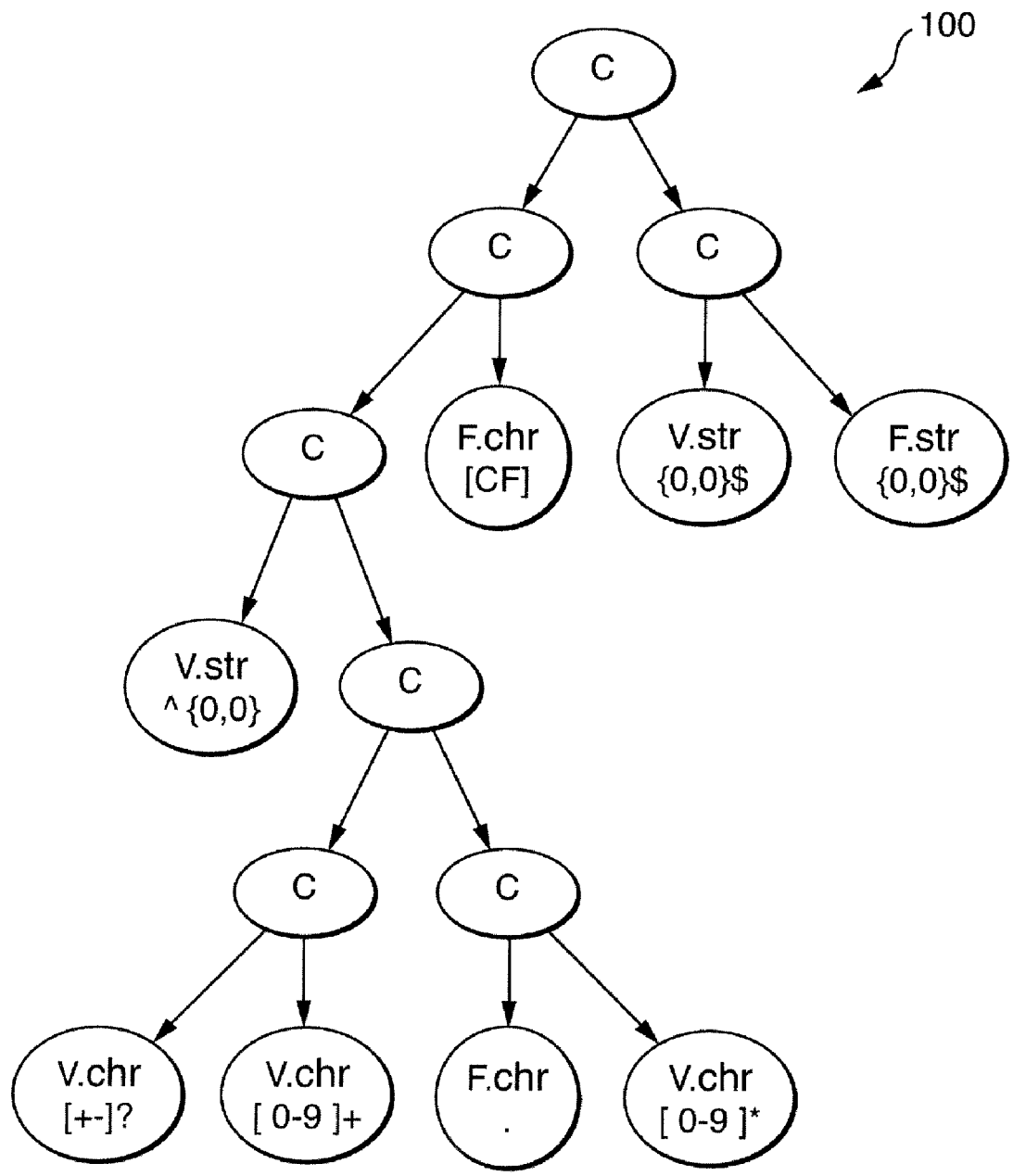
FIG. 1 is a diagram of a parsed regex.

Described herein are aspects of an improved regular expression engine preferably for use in data-network security products including intrusion-prevention and intrusion-detection systems, as regular expressions may be used to classify network traffic as malicious or benign. The improved regex engine provides a fast and flexible method of analyzing data.

Various embodiments may use one or more of the following features: (i) the analysis of states and transitions between them using dynamically determined ranges (state ranges) within the subject being processed; (ii) state transitions that are triggered by a count associated with transitioning into a given state (referred to herein as lambda transitions); (iii) state transitions that are triggered by strings, and the identification of strings in (a) a pre-processing step, (b) an efficient string-identification algorithm, or (c) a hybrid of (a) and (b); and (iv) a method of suspending and restarting regex processing as new data on a flow arrives, without excessively caching already-received data.

The method of analyzing data described herein is state-machine driven as opposed to subject driven. When in a particular state, the system examines the possible egress transitions (i.e. transitions from the particular state to some other state, as opposed to a loop transition, which begins and ends at the same state) out of the state, and looks for events in the subject corresponding to the egress transitions. Note that the "subject" refers to the data stream in which the regular-expression engine is looking for a match to a given regular expression. This is a different approach than feeding events (characters) as input to a state machine, driving transitions in that state machine.

The present methods and systems are not a pure DFA implementation, although they incorporate some DFA concepts. In a DFA, each input event (character) results in a single, unambiguous transition, and there is only one valid state at a time. The present methods and systems redefine the input alphabet (i.e. the types of terms in the subject that trigger transitions from current states to next states) for each regex to be string matches or character-class matches. Note that these events can overlap, if a character in the subject is part of a string match, but also matches a character-class transition. In cases like this, there are multiple paths that must be checked. The present methods and systems attempt to optimize the checking of these paths.

To produce a DFA state machine—representing a particular regex—that utilizes the improvements described herein, an NFA may be converted to a DFA. The NFA is preferably obtained by first (a) parsing the particular regex into a tree of terms and then (b) using a known algorithm, known as Thompson's algorithm, for converting an NFA into a DFA. The terms (i.e. events that drive state-machine transitions) defined herein are character-class (CC) terms and string (i.e. character string) terms, as well as grouped sub-expressions combining strings and CCs. These terms may be stored in a Table and Keyword Tree, respectively.

In the example shown in FIG. 1, the regex is ^([+-]?[0-9]+ (\.[0-9]*)?)[CF]$. This regex is shown in FIG. 1 as having been parsed into a tree 100, where every leaf (i.e. a node without any nodes depending therefrom) on the tree represents a term in the regex. The terms of the regex are connected by concatenation ("C") nodes, each representing a logical AND. The tree 100 in FIG. 1 is a way of depicting the various levels of parenthetically-nested terms in the regex of FIG. 1. Furthermore, it can be seen that this regex begins with a "^", which is known as a start anchor. This means that any matching subject would have to match the portion of the regex that follows the "^" from the beginning of the subject.

The next term in the regex is "[+-]", modified by the "?" specifier. This indicates that the regex is looking for either a "+" or a "-" character, or neither, as the "?" specifier indicates that one or none of the preceding term is considered a match. Next is the character class "[0-9]", indicating "any digit 0-9", modified by the "+", indicating "one or more of the preceding. Putting these two together, one or more digits would be a match.

Next comes a parenthetical that is modified by the "?", indicating that one or none of what is in the parenthetical would match. Inside the parenthetical, the first term is "\.", where the backslash indicates an escape character, which means that a "." is actually sought in the subject, rather than the "." meaning "any character", which it often indicates in regex processing. Next comes the digit character class again, modified by the "*", which means "zero or more of the preceding."

Next comes the character class "[CF]", indicating that either a "C" or an "F" (but not both) would be acceptable. Finally comes the "$", which is known as an end anchor, indicating that, to match this regex, a particular subject would have to end following the "C" or "F". Thus, this regex is looking for subjects such as "3.2F", "+346.78C", "-987.326F", "45F", etc. Essentially, the regex is looking for what may be expressions of Celsius or Fahrenheit temperatures, with or without a decimal point and one or more digits thereafter.

FIGS. 2A-2F depict various terms (or combinations thereof) that may be present in regular expressions, where each term is paired with a graphical representation of a state machine, or perhaps a subpart of a larger state machine, that implements the associated term or combination of terms. In FIGS. 2A-2F, "A" and "B" each represent a term in a regular expression. Note that those terms may be similar to the above examples, or may take other forms. Three basic non-repeat forms are A, AB, and A|B, as shown in FIGS. 2A-2C, respectively. Thus, FIG. 2A depicts just "A" and the associated pair of states labeled "0" and "1". As can be appreciated from FIG. 2A, the presence of the term A in the data subject being analyzed results in the transition being taken from state 0 to state 1.

FIG. 2B depicts a portion of a state machine with an additional state "2", and generally shows how a state machine would look for the terms A and B in series to result in transitioning from state 0 to state 1, and from state 1 to state 2. FIG. 2C shows an alternative structure, where a transition from state 0 to state 1 can be taken if either A or B is present in the subject, and, more specifically, present at the point in the subject that is currently being evaluated when the processing through the state machine is in state 0.

FIGS. 2D-2F depict what are known as repeat specifiers, which generally refers to the above-explained ?,+, and * that come after the term A in FIGS. 2D-2F, respectively. The ? in FIG. 2D indicates that the preceding term A need be present either zero or one times at the currently-evaluated position in the subject, to make the transition from state 0 to state 1. This is shown by the two alternative transitions available in FIG. 2D, where the upper transition is driven by the presence in the subject of the term "A," while the lower transition is what is known as an "epsilon" transition, which corresponds to the transition being valid regardless of what is present at the currently-evaluated portion of the subject. Essentially, FIG. 2D is conveying that a transition can be made on an A or on nothing (an empty string).

This illustrates some general terminology related to the present methods and systems. Generally, the data being analyzed by the state machine is referred to as the "subject," or "data subject," and may, in the context of assessing network traffic in an intrusion-prevention system, include a payload of one or more packets, such as Internet Protocol (IP) packets. Furthermore, a value known as the "cursor" is maintained, which corresponds to a particular position in that subject—typically indexed starting with zero—that is currently being evaluated by the state machine. Note that, in typical state-machine implementations, a transition from one state to another corresponds to "consuming" a single character in the subject, and, accordingly, advancing the cursor to the next position to be analyzed while in the next state. Epsilon transitions, however, do not advance the cursor.

Continuing the previous examples, FIG. 2E depicts the state-machine implementation of the +quantifier, which generally indicates in FIG. 2E that the state machine will be looking for one or more consecutive occurrences of the term A, which, again, could be a string, or a particular character class (such as digits 0-9 or letters a-z). This can be seen in the state-machine implementation where, with epsilon transitions, a single A will result in arriving at state 3, as will any number of consecutive A terms. FIG. 2E is clearly an NFA, then, as, for example, valid epsilon transitions are present from state 2 to both state 3 and to state 1.

Finally, FIG. 2F depicts the * quantifier, which generally indicates that the state machine will be looking for zero or more consecutive instances of the A term. This is shown in FIG. 2F as merely modifying FIG. 2E by adding an epsilon transition from state 0 to state 3. Note that, in each of the examples shown in FIGS. 2A-2F, the state machine is considered to have found in the subject a match for the associated term (or terms) if the processing of the subject results in the state machines (or state-machine sections) proceeding from the left-most state to the right-most state. In that sense, the right-most state in each of FIGS. 2A-2F may be referred to as a "match state" (also known as an "accepting state") for the associated term or terms (and associated quantifier if applicable).

2. Lambda Transitions

In addition to the operators and specifiers described above, some regexes include specifiers known as "count specifiers," which indicate how many of the preceding term are being checked for at the currently-evaluated portion of the subject. For example, if a regex included A{5}, this would indicate that five consecutive occurrences of the "A" term were being looked for in the subject. And again, A could be a character string, such as "boy", or a character class, such as [0-9], which corresponds to "any digit 0-9". More generally, A{x} would indicate x consecutive instances of A. In a traditional state-machine implementation, this would take the form of a series of six states, with an "A" transition between each pair of states in the series.

Another type of count specifier that appears in regexes takes the form A{x,y}, which generally correlates to looking for at least x, but no more than y, consecutive instances of A in the currently-evaluated part of the subject. In a traditional state-machine implementation, this would take the form of a series of approximately x+1 states in series, with "A" transitions in between, that require x consecutive A terms, followed by a series of states having "A" transitions to the next state, but also having epsilon transitions to a match state, to look for (y-x) more A terms. Thus, processing would be complex, with numerous valid alternative paths.

The present methods and systems simplify state-machine implementation and processing using a type of transition referred to herein as a "lambda transition." Every state preferably has a count parameter (i.e. state count) that is initialized to zero, and then is incremented each time the state is entered (i.e. transitioned into) and decremented when the state is 'backed out' of after an attempted match. This is to facilitate the two types of lambda transitions described herein, referred to as "Lambda1" and "Lambda2" transitions. That is, instead of taking a repeat count such as A{5} and converting it to a series of six states as described above, two new functions Lambda1 and Lambda2 are provided as follows:

Lambda1($x$): transition if the count of the current state is equal to x.

Lambda2($x$): transition if the count of the current state is less than or equal to x.

Figure 3A:
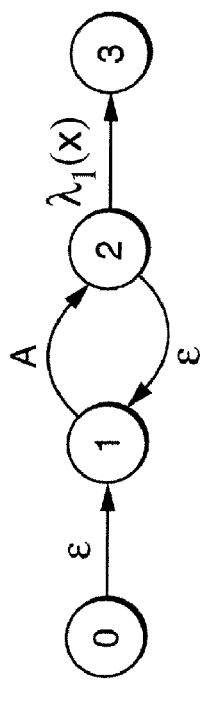
FIGS. 3A-3C are state flow diagrams for states having lambda count transitions.

FIG. 3A depicts the simplified state-machine implementation of A{x} when the Lambda1 function is incorporated along with state counts. Thus, state 2 maintains its state count, and increments that state count each time state 2 is transitioned into. Once x consecutive occurrences of A have been identified in the subject, state 2's state count will be equal to x, and state 2 will thus execute the Lambda1 transition to state 3. It can be seen that the cooperation of state counts and the Lambda1 transition obviate the need for an extended series of states to look for a certain number of consecutive occurrences of a particular term.

Figure 3B:
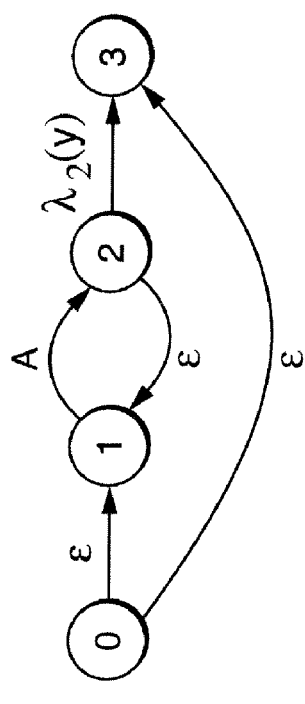

FIG. 3B depicts the simplified state-machine implementation of A{0,y} when the Lambda2 function is incorporated along with state counts. According to the A{0,y} subexpression, at least zero and no more than y consecutive occurrences of A are being sought in the currently-evaluated portion of the subject. FIG. 3B is similar to FIG. 3A; however, FIG. 3B does include an epsilon transition from state 0 to state 3, since zero consecutive occurrences of A is considered a match for this subexpression.

Another difference is that the transition from state 2 to state 3 is a Lambda2 transition instead of a Lambda1 transition, and will thus be taken if state 2 is entered, its state count is incremented, and that incremented state count is less than or equal to y, which satisfies the condition of "at least zero and no more than y consecutive occurrences of A. Thus, the incorporation of the Lambda2 function and state counts also reduces the number of necessary states, since a traditional state-machine implementation would have a series of approximately y+1 states with "A" transitions in between, and each with an epsilon transition to a match state.

Figure 3C:
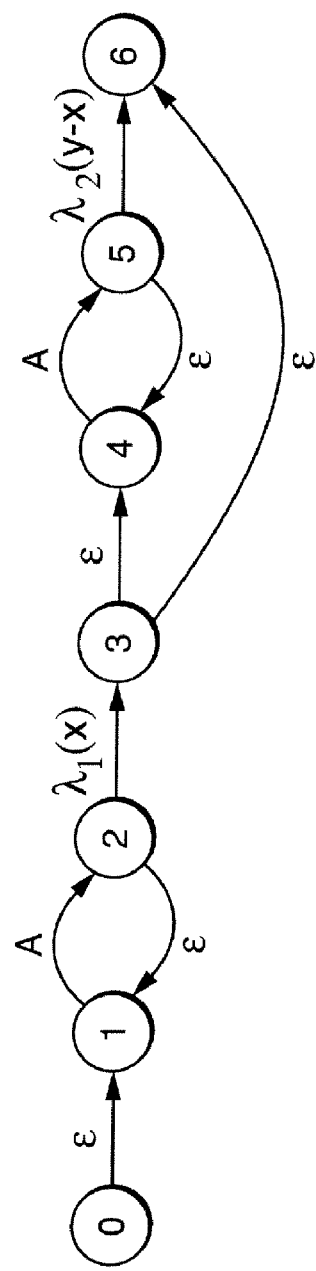

Other patterns can be constructed. For example, FIG. 3C depicts the state machine implementation of A{x,y}, which is equivalent to A{x}A{0,(y-x)}. Once A{x,y} is rewritten as A{x}A{0,(y-x)}, it can be appreciated that it can be implemented as two smaller state machines joined by an intermediate state 3. The first of these smaller state machines matches that shown in FIG. 3A, and looks for x consecutive instances of A. The second is similar to FIG. 3B, with the exception of the Lambda2 transition having a threshold value of (y−x) instead of y.

3. NFA to DFA Conversion

As referenced above, an algorithm known as Thompson's algorithm can be used to convert an NFA to a DFA. To carry out this algorithm, an initial step is to define a start state and an end state, and pass those to a function along with a root node of the tree. The function defines intermediate nodes as required, and recursively inserts terms to produce a state graph 400 like the one shown in FIG. 4.

The NFA 400 is then converted to a DFA 402. In general, a given state in the DFA corresponds to a set of states from the NFA. The NFA state set defines the DFA state and which transitions are valid. To determine these state sets, a recursive process is carried out, starting with the initial state in the DFA (D0) being set to include the initial NFA state (S0) as a seed. After that, the following steps are performed on S0 and, in turn, on the other states in the NFA 400, to arrive at the mapping shown in FIG. 4:

(i) Expand the seed state to the epsilon closure, thus defining a state set in the NFA. In other words, for every NFA state in the state set, follow the epsilon transitions and include those states in the state set as well. Continue this until all epsilon-reachable states are included;

(ii) Follow non-epsilon transitions to define next states for the currently-evaluated DFA state. For unique non-epsilon transitions from the NFA states, there will be a next state. A unique transition is defined by the event that triggers the transition (i.e., a string match for 'boy'). Note that, in an NFA state set, there may be multiple transitions to various states based on the same event. All of these are grouped into one transition to a DFA state that is seeded with the target NFA states; and (iii) Recursively repeat the process from step (i), starting with the new DFA state containing the target NFA state set.

After expanding a DFA's states to the epsilon closure, there is a check to make sure that there is not already a DFA state that includes exactly that NFA state set. This prevents generation of duplicative DFA states.

Figure 4:
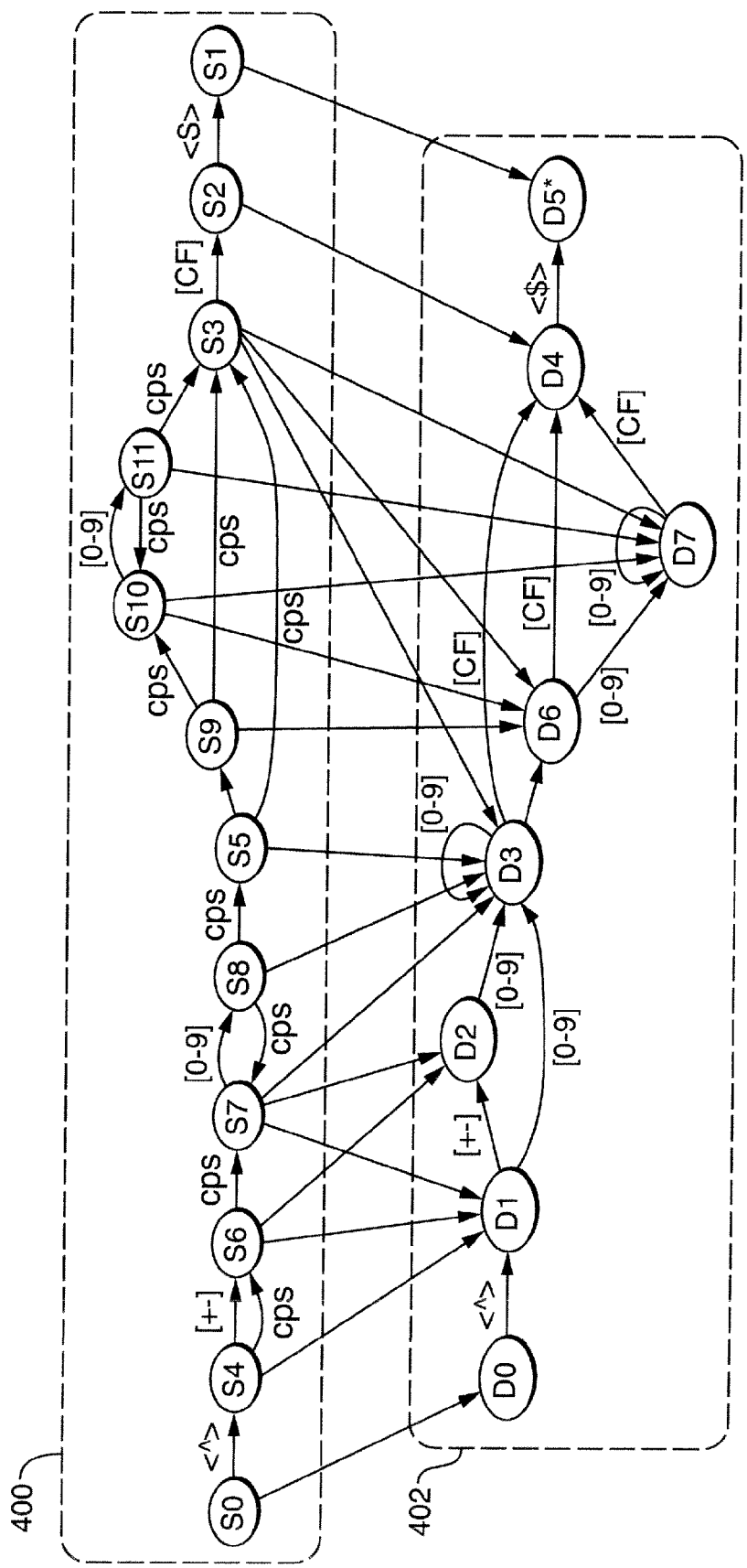
FIG. 4 is a state diagram showing an NFA to DFA conversion.

Thus, in the example of FIG. 4, one may start with D0:{S0}. Because there are no epsilon transitions from S0, D0 is complete. Next the transition from S0 to S4 is analyzed. Including the epsilon closure of S4 in a new DFA state, D1 is obtained:

D0:{S0}
D1:{S4,S6,S7}

The transitions from the D1 state set are from S4 to S6 and from S7 to S8. Each of these results in new DFA states. Continuing this process gives the complete set of DFA states:

D0:{S0}
D1:{S4,S6,S7}
D2:{S6,S7}
D3:{S3,S5,S7,S8}
D4:{S2}
D5:{S1}
D6:{S3,S9,S10}
D7:{S3,S10,S11}

Connecting these states with the appropriate transitions gives DFA 402 of FIG. 4. Note that DFA 402 utilizes the concept of character classes (CC). In accordance with the present methods and systems, CC matches are determined as needed during processing of the regex, and, to facilitate more rapid processing, each CC term in the regex is converted to a bit-mask array in a stored rule base. In particular, if there are 128 possible characters, then each character of a particular character class is mapped to a bit within a 128-bit mask word. Each character class may therefore be represented by a 128-bit mask-word where the 1 bits indicate that the corresponding character is a member of the class. To determine whether a given character of the subject being analyzed is a member of the class, it is simply converted to a corresponding bit position, and that position is interrogated to check whether it is a 1.

The DFA of FIG. 4 also includes what are referred to herein as character-class-loop (CC-loop) states. A CC-Loop state is a state that has a character-class loop transition, which is a transition to itself, where that transition is associated with a CC event. For example, states D3 and D7 in the DFA 402 of FIG. 4 are CC-loop states. Using D3 as an example, it can be seen that there is a character-class loop transition out of and back into D3, where the subject event driving that transition is any digit 0-9.

Note that DFA 402 also includes anchors. A regex may be considered an anchored regex if it includes a beginning anchor (^), which specifies that matching the ensuing terms in the regex must start at the beginning of the subject. The start anchor is thus depicted as the transition from state D0 to state D1. A regex may also be considered an anchored regex if it includes an end anchor ($), which specifies that the subject must end (e.g. with an end-of-data indication, end-of-file indication, etc.) once the regex term preceding the end anchor has been identified in the subject. In DFA 402, an end anchor is the transition between D4 and D5.

In the example DFA 402 of FIG. 4, state D5 is marked with an asterisk, indicating that D5 is what is known as an accepting state. In general, an accepting state in a DFA that was generated from an NFA is any state that includes the NFA's end state (here, state S1 of NFA 400) as one of its component states. If an accepting state is reached during regex processing, the subject that is currently being processed is considered to have matched the regex that was used to generate the NFA in the first place, in accordance with the principles described above. In the context of intrusion prevention, this may result in the subject (or the packet(s) that included the subject) being quarantined for further processing. After DFA is generated from the NFA, all of the DFA states are checked to see if they include the NFA's end state. Those that do are marked as accepting states. In FIG. 4, state D5 is the only state that includes NFA state S1, which is the end state in the NFA graph. D5 is therefore marked as an accepting state.

In accordance with the present methods and systems, after generation of the NFA from the regex, and further after generation of the DFA from the NFA, the DFA is preferably checked for certain cases involving count specifiers (i.e., lambda transitions) that may not be handled properly. If these patterns are found, an alternative prior art method such as PCRE may be used to handle the particular regex. Some specific examples include (i) repeat subexpressions with optional last terms (if the last term of the subexpression is optional, and the subexpression as a whole is modified by a repeat specifier, the algorithm for generating the DFA graph results in the Lambda transition splitting between two DFA states); and (ii) mixed loop-count states (string and CC-loop events, when there is a loop transition associated with a character-string event, as well as a character-class loop transition in the same counting state). In addition, certain features are not supported, including backreferencing (referring to text that was matched by a previous portion of the regex by a label at a later point in the regex) and atomic captures (referring to an ability to specify that certain subexpressions in a regex must be matched indivisibly, using a search policy known in regex processing as greedy matching).

4. State Ranges

In one aspect, the preferred system and methods avoid re-evaluating parts of the subject (the network traffic or byte stream that is being checked against one or more regexes) as much as possible. To do this, the system utilizes a concept referred to herein as a "checked range", also referred to herein as a "state range". The checked range is used to determine how far to advance in the subject when checking for transitions from a current state to a next state.

Note that, in general, a transition that connects a current state to a next state in the state diagram is also referred to herein as an "egress event" for the current state (and an "ingress event" for the next state). The checked range is denoted as a pair of positions delineating the start and end positions of a substring of the subject. The range start and end positions are inclusive; for example, if a checked range were [5,8], this would include characters at positions 5, 6, 7, and 8 in the subject.

Figure 5A:
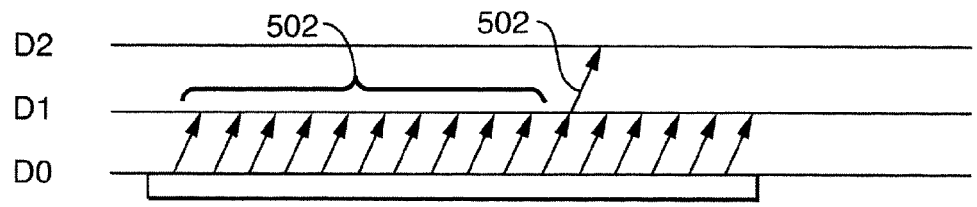
FIGS. 5A-5C are diagrams depicting the use of checked ranges.

As shown in FIG. 5A, traditional state-machine implementation and processing might involve numerous transitions 502 from state D0 to state D1, and failure back to state D0, before a valid transition 504 to state D2 is identified at a later position in the subject. In general, in FIGS. 5A, 5B, and 5C, the arrows represent transitions between states (while failures back to states are not shown), the horizontal lines (labeled by state name along the left side) represent different states in the DFA, and the horizontal position on those horizontal lines represents relative position in the subject being analyzed. Thus, the left end of the horizontal lines would be more towards the beginning of the subject, while the right end of the horizontal lines would be more towards the end of the subject.

Figure 5B:
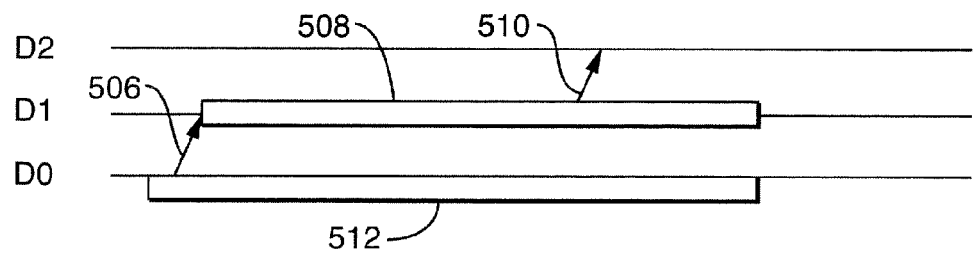
Figure 5C:
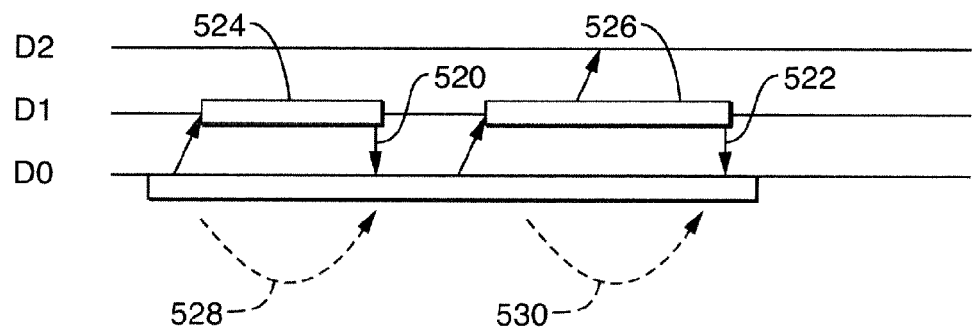

FIGS. 5B and 5C also include rectangles placed along several of the horizontal lines. These rectangles represent checked ranges that have been calculated for their respective states as further described below. Thus, FIGS. 5B and 5C demonstrate the benefit of the checked-range concept of the present methods and systems, though not the calculation of those checked ranges. In general, upon transitioning into a particular state, a checked range for that state is calculated, where that checked range corresponds to a range of positions in the subject in which the present methods and systems will search for a valid transition to a next state (i.e. for an egress event).

With reference to FIG. 5B, state D0 is shown as having a checked range 512, while state D1 is shown as having a checked range 508. Thus, processing is initially in state D0, where checked range 512 is calculated for state D0. D0 may have one or more transitions to other states in the state diagram. Note that the states referenced in FIGS. 5A-5C are not necessarily those from FIG. 4; rather, they generally represent states in an arbitrary state diagram that is generated and evaluated in accordance with the present methods and systems.

Returning to FIG. 5B, then, the subject is checked within checked range 512 for a valid egress event to D1. Such an egress event is found and taken at 506. Thus, processing then moves to state D1 as the current state, at which point D1's checked range 508 is determined. The subject is then checked within D1's checked range 508 for a valid egress event out of D1, and such an event is found and taken to state D2 at 510. It can thus be appreciated in FIG. 5B that, by using checked ranges, D2 is reached in just two transitions rather than needing the many attempts and failures involving many transitions as shown in the traditional state-machine implementation of FIG. 5A.

In general, according to the present methods and systems, the state machine intelligently looks ahead in the subject for valid egress events, rather than naively trying a single character at a time, taking the transitions, failing back to the previous state, and repeating this process until, for example, the transition 504 from D1 to D2 is found. As described more fully below, while D1 is the current state, the present system is evaluating all of the positions in the subject at which the transition from D0 to D1 could happen, to try to find one of those positions that would result in a valid transition from D1 to D2. The present system, then, shortcuts and precludes the numerous attempts and failures by seeing that they would happen, and advancing through the subject to find a point in the subject at which such attempts and failures would end, and a valid transition (egress event), for example from D1 to D2, can be located. And this is done repeatedly in a recursive fashion, accomplishing faster and more efficient subject processing than is possible in traditional state-machine implementations.

In preferred embodiments, as described above, the subject is evaluated within the checked range for a given state for the presence of further transitions (egress events to next states) whenever a state is entered (i.e. transitioned into). In some cases, the checked range for a given state can be thought of as the range of positions in the subject for which a transition into the given state is possible. In general, a checked range is referred to as such because it is the range of positions in the subject that will be checked until the presence of a valid egress event is found in the subject, or until all of the current state's transitions to next states have been evaluated in the checked range.

A checked range (i.e. state range) can be as long as the entire subject, or as short as a single character, like [k,k], where 'k' represents a given index (i.e. position) in the subject. In general, during processing, a value known as the "cursor" is maintained, which corresponds to a position in the subject that is currently being evaluated, and thus is dynamically updated during processing. Typically, a given state's checked range will begin at the position where the cursor is when the given state is transitioned into, and will be calculated to be something between [cursor,cursor] and [cursor, end-of-subject], inclusive.

As referenced herein, it sometimes occurs in processing a subject using a given state machine that no valid egress events can be found for a given state within that state's checked range; in that situation, processing returns to the state from which the given state was transitioned into, often referred to herein as the "previous state". As shown in FIG. 5C, in accordance with the present methods and systems, when a state fails back to a previous state, such as from D1 to D0 at 520 and 522, the checked ranges 524, 526 of D1 are used to advance the cursor when in D0 to the end of the most-recently-calculated checked range of D1, as shown by arrows 528, 530. This is because any of the events in the subject in that range that would have caused an egress transition from D0 into D1 have already been checked for D1 egress transitions. Thus, reprocessing of the same portion of the subject is reduced.

This type of processing is illustrated in the following pseudocode, which pertains to a current state having an egress event to a next state (nextState), where that egress event is associated with matching a particular character class in the subject. Note that, when the transition to nextState is taken, this is accomplished by calling a recursive "search-state" function. Thus, the illustrated pseudocode would also, in this embodiment, be inside that same "search-state" function, which operates to take transitions in the state machine by calling itself. It can be appreciated from this pseudocode that, if processing backs out of and returns from this call to search-state without arriving at an accepting state (i.e. match state) (at which point processing would stop and the subject would be considered to match the regex that was used to generate the state machine), then the cursor is advanced to the position just past the next state's checked range (i.e. checkedEnd+1).

```
while(the cursor is not yet to the end of the subject)
{
        if(subject matches the character class at the cursor)
        {
                // Take the transition to the next state
                search-state(transition->nextState, cursor);
                // Skip ahead in the subject so as to avoid needlessly
                // rechecking nextState before the end of its checked
                range
                cursor = transition->nextState->checkedEnd + 1;
        }
        else increment the cursor;
}
```

For states that have a CC-loop event, an intermediate range, referred to herein as a a "term range" is first calculated, prior to arriving at an answer for those states' checked ranges. In general, this term range for CC-loop states marks the range in the subject, starting at the cursor, where the CC-loop event matches. This type of state then calculates its own checked range based on the term range, essentially determining in what subset (which could be all) of the term range a valid egress event could occur, and this calculation may differ depending on the type of egress events the given state has, as described more fully below. The algorithm for computing the term range in the case of a CC-loop state is essentially:

```
// CC is character class for loop transition
checkedEnd = cursor;
while( CC matches at checkedEnd ) ++checkedEnd;
```

Note that a lambda threshold of a lambda transition may be taken into account when determining checked ranges. For example, a checked range may end a number of characters short of a term range, where that number of characters is based on a lambda-transition threshold.

Consider the state machine of FIG. 4 operating on the subject: <<subject=-270.1C>>. The state machine will enter state D3 after the '2' character, which is at position 1 in the subject (indexed from zero). Thus, upon entry into state D3, the cursor will be set to position 2, in other words pointing to the "7" in the subject. D3 will then compute its term range to be [2,4], which are the positions, starting with the cursor, at which D3's CC-loop transition (looking for any digit 0-9) matches, along with one additional character. As explained more fully below, since each of D3's egress events (i.e. the transitions to D4 and D6) only have a length of one character in the subject, D3 will compute its checked range to also be [2,4]. These are the positions in the subject that will be checked for the events that can move to another state.

As shown in the previous example, in non-lambda-count states, the term range and the checked range are the same. However, for count states (those involving lambda transitions), the term range and checked range will differ because the checked range denotes the range where transitions to the next state may occur, and that depends on the state count. The use of state ranges is a mechanism to avoid rechecking CC event matches.

With respect to lambda transitions, (recall that a Lambda1 transition is taken only if the count of the current state is equal to the lambda threshold value), if we consider the regex: <<regex=^.{5}>>, the checked range for the CC-loop state corresponding to the dot character class would normally extend ever the entire subject, since the dot is generally used in regex notation to denote "any character". The nature of the Lambda1 function limits this range, however. The next state can be entered only at position 5 in the subject, but the checked range of the loop state is defined as [0,0], since the validity of the Lambda1 function has only been verified at this position. The cursor for the next state is set to position 5, because the 5 characters were 'consumed' by the Lambda1 transition. In this sense, it behaves similar to a string event.

Lambda2 state ranges are calculated and checked in exactly the same way as Lambda1 ranges. However, when transitioning to the next state, Lambda2 transitions do not consume characters in the subject up to the lambda threshold count value. The cursor for the next state is set to the cursor of the current state, thus not 'consuming' any characters in the subject, instead of <<cursor+lambda threshold>>, as is the case with Lambda1 transitions.

With respect to regexes that include start anchors, these are handled by setting the checked range of the initial state (D0) to be [0,subjectLength] (which generally would be the checked range of the initial state whether the regex in question begins with a start anchor or not), and processing an anchor transition only if the cursor is 0. When entering the next state after the anchor, the checked range is set to [0,0]. If there are other transitions from the initial state, the checked range is computed in the usual way. This allows processing of regexes like <<(^|[0-9]+)dog>>. A state is said to be anchored if its checked range is a single position. Often this is determined by the range of the previous state and the event that caused the transition to this state.

Figure 6A:
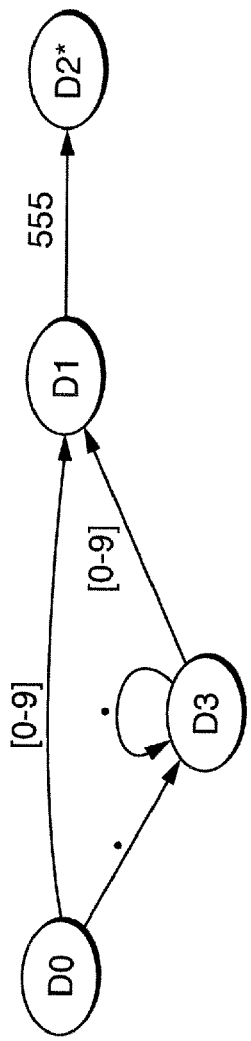
FIGS. 6A-6B are state diagrams exemplifying aspects of the state transitions.

Additional processing advantages may be obtained using adopted ranges, where the checked range of a state is based on the checked range of a previous state. Consider the example regex: <<regex=.*[0-9]555>> as shown in FIG. 6A. In this case, state D3 has a range that extends to the end of the subject because it has a 'dot' (i.e. any character—in general the "." is shorthand in regex processing for a character class that matches anything) loop event. If the subject: subject=abcd123456781234555678efgh is processed, a CC match that allows a transition to state D1 is found at position 4. Note that a transition to state D1 can also occur at any position up to 21.

To avoid taking the transition to state D1 multiple times in cases like this, the present methods and systems use the concept of checked ranges, and more specifically in this case, an adopted range, extending the checked range of some states based on the checked range of their previous state. This can be done in states that do not have a CC-loop event. The calculation of the end of the current state's checked range may be performed, using the previous state's checked range, as follows (where "CC" pertains to the character-class ([0-9]) that is associated with the transition from the previous state (D3) to the current state (D1), that transition also being known as the "ingress event"):

```
checkedEnd = cursor;
while((CC matches at checkedEnd) &&
    (checkedEnd < previous_state->checkedEnd)) ++checked End;
```

The result of this in the present example is that the checked range for state D1 is [5,22], and the search for the string term "555" can be done very quickly, finding a match at position 19 in the subject. Thus, states following CC-loop states can sometimes adopt a range based on the previous state's checked range.

Figure 6B:
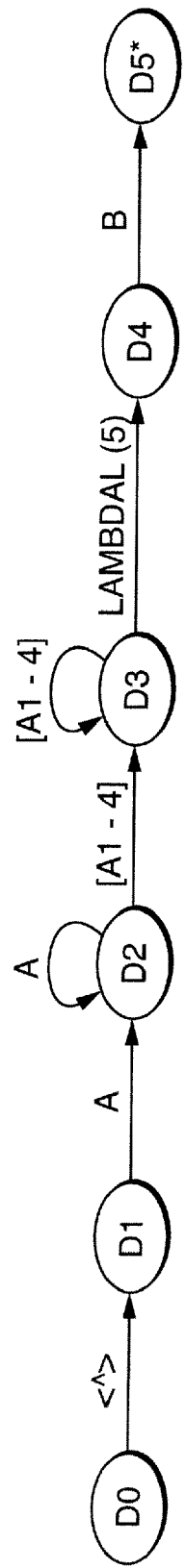

Similarly, states following CC-loop-count states (i.e. states that are transitioned into using lambda transitions) can adopt a range based on the previous state, but care must be taken to account for characters consumed by the count function. For example, consider this regex: regex=^A+[A1-4]{5}B shown in FIG. 6B. The range of D4 is determined by the range of D3. As such, we can compute the range of D4 as follows:

```
D4.start = D3.start + lambda_count − 1;
D4.end = minimum(D3.end + lambda_count − 1, subjectLength );
```

There is an offset of −1 when computing these values to account for the character that was consumed on entering D3. There is a similar formula to compute the range of a state following a Lambda2 transition;

```
Dn.start = cursor;
Dn.end = MIN( cursor + Lcount − 1, prev->end );
```

5. Incremental Operation

One additional aspect of the present methods and systems is the ability to save the state of a search and resume searching as more data becomes available, such as when an additional packet arrives that includes a next part of a subject to be analyzed, as may often be the case when analyzing a flow of Transmission Control Protocol (TCP) data. Because the methods and systems described herein are not a pure DFA implementation, this pausing and resumption of processing is not as simple as remembering the last state. Because there may be multiple attempted paths through the state machine depending on the subject, it is possible that the end of the available data can be reached in multiple states. In accordance with the present methods and systems, only as much information as is needed, which often will be less than the entirety of the data that has arrived up to that point in the processing, is retained for resumption of processing upon arrival of additional data.

Every state in a graph has a characteristic value referred to as the state maximum tail that defines the maximum number of characters at the end of a portion of a subject that need to be saved to allow restarting of processing. This value depends mainly on the possible transitions out of the state. If a state has one or more string transitions out, the state maximum tail may be determined by the length of the longest string event among those string transitions. For example, if a state has an egress transition associated with a string that is 10 characters long, it cannot be guaranteed that a string match does not start 7 characters before the end of the subject.

If a state has a CC-loop event and a lambda count egress transition, the state maximum tail may be equal to the lambda count. This is similar conceptually to the case of a string match, because the count condition may evaluate true at some point past the boundary between the available data and the data that is yet to arrive.

Difficulties may arise if a state has a CC-loop event and it has at least one CC egress transition. CC-loop states define their own range by determining how long the CC-loop event matches from the cursor looking forward in the subject. As described herein, states with a CC-match ingress event—and no CC-loop event—derive their state range from the previous state's checked range. An adopted range preferably does not extend beyond the checked end of the previous state. This is not possible in the case of a restart because, as described below, there is no previous state to which to refer.

The solution is to rely on the fact that the CC-loop state computes its range independent of previous states. For each CC-loop state, the system computes the max depth of possible paths until either another CC-loop state or accepting state is reached. This determines the maximum number of states that can derive their range from the CC-loop state. Noting the fact that every CC transition to another state consumes one character, if the search starts that number (the state maximum tail for this type of state) of characters back from the boundary, the system will reach the maximum depth state at the boundary between the already-received data and the later-received data. This means that no potential paths through the state machine will be missed.

The actual tail length of a state is determined at the time of the search. When it is determined that a state should be restarted when new data arrives (because a match/no match determination cannot be made), the system takes the maximum of the three possible tail lengths described above. It then computes the distance from the state entry (i.e. the cursor) to the end of the current data (referred to herein as the state range tail). The actual tail length required to guarantee accurate searching on restart is the lesser of the state range tail and the state maximum tail. Thus, a number of characters will be saved at the end of the currently-evaluated portion of the subject, and that number will be at least the actual tail length, and perhaps more, depending on the restart information saved in other states. The paused state will then fail back to its previous state after saving its restart information, and will convey its calculated actual tail length to the previous state.

The restart information also preserves the distance from the end of the paused state's checked range to the end of the currently-available data. Often this value will be 0, if the checked range extends to the end of the data. Sometimes, however, the checked range stops short of the end of data, but the search result cannot be determined (e.g. if waiting for a possible string match). Saving this value lets the checked range be set appropriately on restart and prevents possible erroneous matches.

For example, assume that a state has a state maximum tail of 10 characters based on a string egress transition. If the state is entered 5 characters before the end of the current data, the system should not restart 10 characters before the boundary between the already-received data and the later-received data, because that could lead to an erroneous match. On the other hand, if the state is entered 15 characters from the end, and the checked range extends to 5 characters before the end, the restart range would be set to (−10,−5) (expressed in character positions, relative to the old/new data boundary), because the state's maximum tail is 10.

Figure 7A:
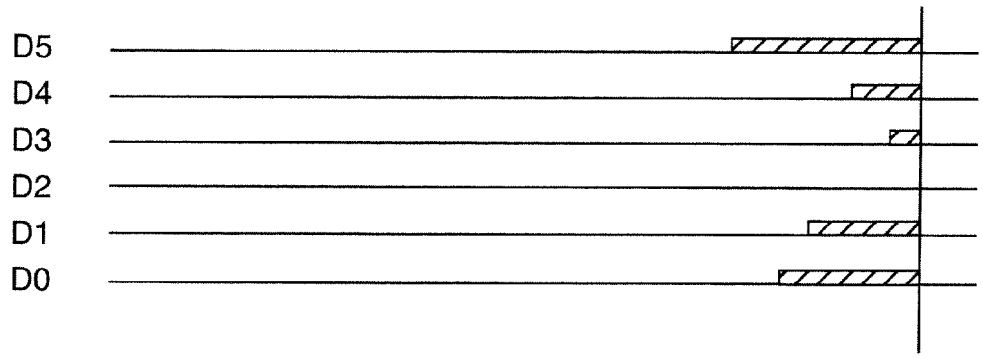
FIGS. 7A-7C are diagrams depicting the incremental operation of the state analysis.
Figure 7B:
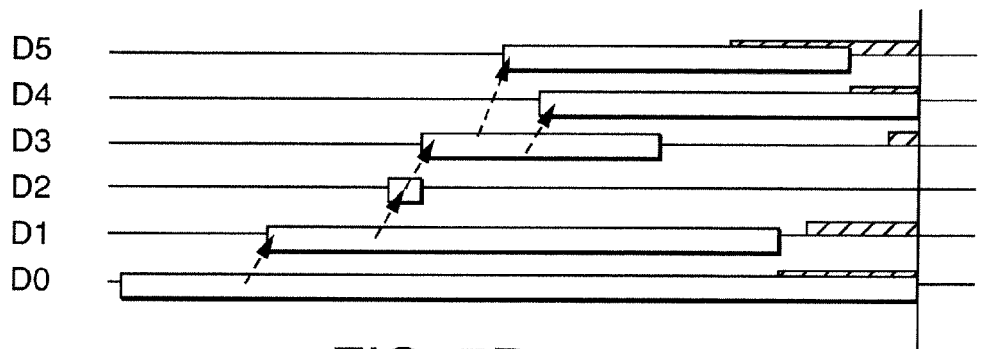
Figure 7C:
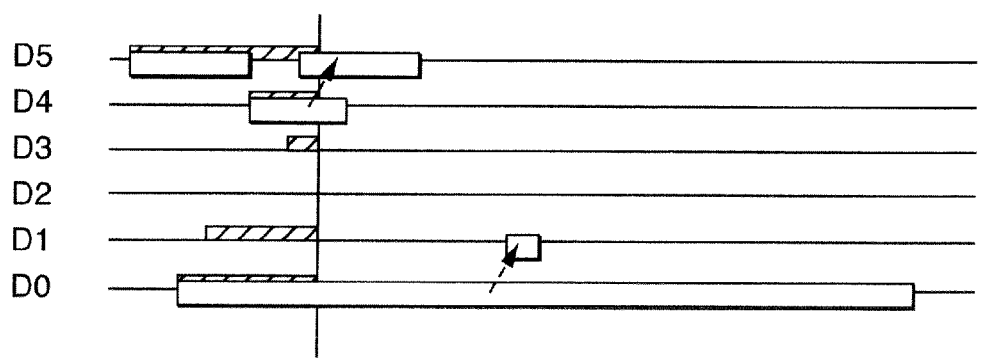

FIG. 7A graphically depicts the above-described concept of each state having a characteristic tail (state maximum tail), which defines a range at the end of the subject. Within that range, a full decision on transitions cannot be made because more data is required. The tails are determined by the terms in the regex and are computed at compile time. In this case, states D0, D4, and D5 have checked ranges that overlap the state tails, as shown by the white rectangles in FIG. 7B, where the darker rectangles are the same state maximum tails from FIG. 7A. These three states are thus candidates for restart, in other words for incremental operation. These three states are restarted when new data arrives as shown in FIG. 7C. Note that, in all three figures, the vertical line represents the boundary between the data that was available prior to pausing the processing (to the left of the vertical line) and the data that became available later, causing processing to restart (to the right of the vertical line).

6. Handling of String Terms in Regexes

Some preferred embodiments utilize keyword trees (KT) to preprocess a subject. A keyword tree is a data structure used to quickly locate fixed strings in a longer string (e.g., the subject being inspected). Using a KT, a string match at a particular location may be treated as a single event that drives the state machine. That is, because the location of all matches of fixed strings from the regex are known prior to processing the subject using the state machine, the regex parsing treats strings as single terms that drive transitions from one state to another.

In one preferred embodiment, all of the string matches that occur in the subject (i.e. strings from the regex that are found in the subject during a KT preprocessing step that occurs prior to using the state machine generated from the regex to process the subject), sorted by the starting position, are provided in an array. Sorting the KT matches is preferably done in the keyword tree itself, and does not significantly impact performance of the KT. Matches only need to be sorted when there is a longer string in the tree that includes a shorter substring. The longer string starts first, but the KT does not recognize the longer string until after the short one has been located and included in the result set. In this case the substring is shifted in the results array and the longer one is inserted in its place.

Preferably, the KT search has the ability to handle both case-sensitive and case-insensitive searches. In the KT, each character of the keywords is modeled as a node on a branch. If the keywords are added to the tree to support case insensitivity, then for a string of length N, all permutations of case must be added (2^N keywords). Instead of adding the permutations of keywords to the KT, the KT search function was modified to look for case insensitive paths. At every node the search function checks to see if there is a child node for the next character C. If there is not, it checks for the case compliment C'.

The result is that the KT search returns all case-insensitive keyword matches. In situations where case-sensitive match is important, a check can be made to confirm the case match. This check only needs to be performed if the regex search has reached a point where a case-sensitive string match can cause a state transition, and the check is basically a compare over the length of the string at the location of the match in the subject. The rule base used to process the subject is shown in FIG. 8A.

Figure 8A:
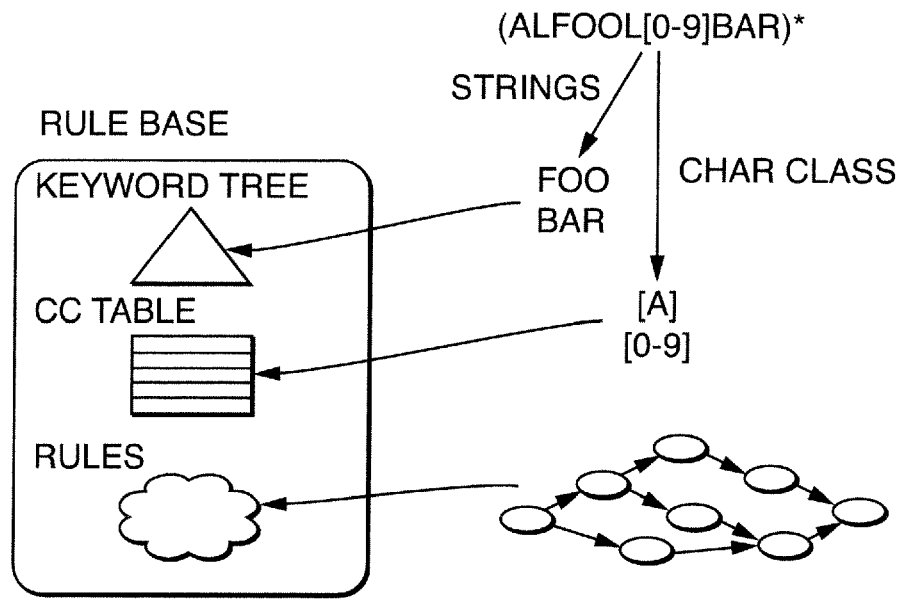
FIGS. 8A-8C show the various components of a rules base for analyzing data subjects.

As can be seen in FIG. 8A, the fixed strings in the regex are identified, and the subject is preprocessed using a KT, and the results of that KT are added to the rule base, such that the presence and location in the subject of the strings from the regex are known and stored in the rule based prior to processing the subject using the state machine generated from the regex. Furthermore, the character classes in the regex are identified and encoded as bit-mask byte words, as described above. Finally, the state machine is generated from the regex as described herein, and stored in the rule base as a state-transition table, essentially with an entry for each state, where each entry includes the parameters described herein, along with information as to that state's egress transitions.

Figure 8B:
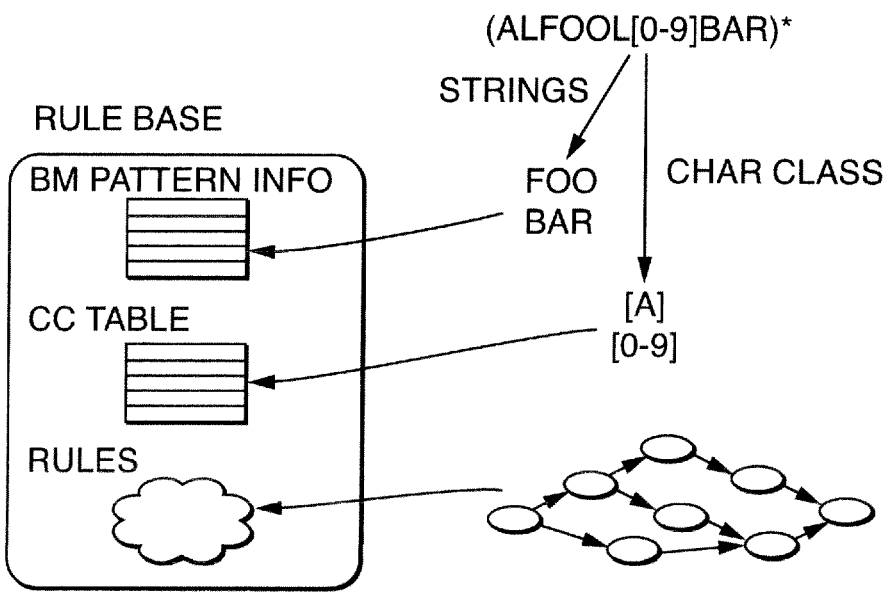

In a further embodiment, a traditional string search is utilized. One such search methodology is a Boyer-Moore (BM) search algorithm, which is an efficient and widely used way of finding strings in a subject. The bulk of the logic for evaluating regexes is substantially the same. The primary difference is in how string transitions are processed. Instead of iterating through a set of KT string matches looking for a particular string, a BM search in the subject is performed from the current position to the end of the state's checked range. Any matches found cause the string transition to be taken. The change from KT to BM changes what gets compiled into the rule base. Because the Boyer-Moore algorithm preprocesses the search string into information that can be saved for expediting the real-time BM searching in the subject, the strings from the regex are stored in the rule base, as shown in FIG. 8B.

In a further alternative embodiment, a hybrid of using the KT and BM methods described above may be used. In some situations, the KT produces numerous hits for 2-character, 3-character, and 4-character strings, for example. It also produces many hits for strings with a single repeated character. For example, if the KT includes strings '00', '000', '0000', and the subject includes a long block of 0s, the KT generates three hits for each position in the subject. In tests, it was not unusual to get 500-1000 KT hits for a 2000-byte subject, causing degraded performance.

Figure 8C:
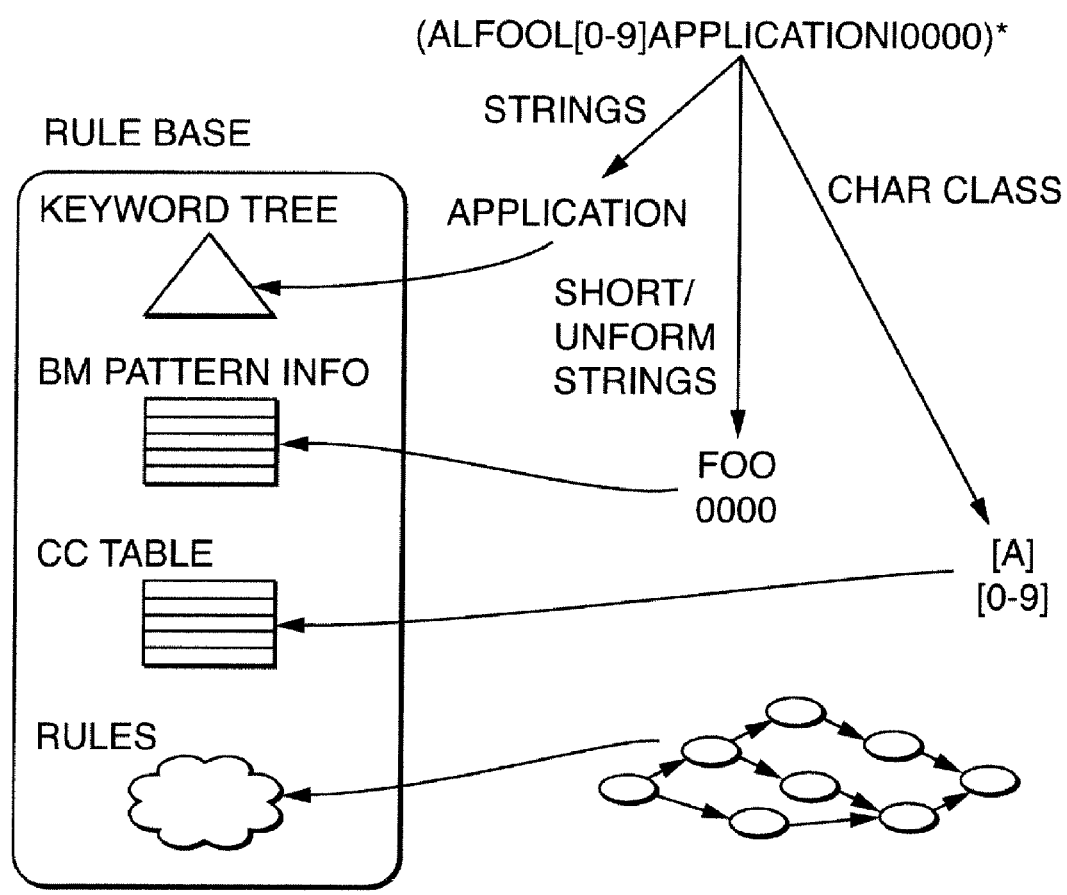

Thus, Boyer-Moore is preferably used to analyze strings such as short or uniform strings, or other cases that are not handled efficiently by the KT. Preferably, at compile time, the string transitions are flagged to specify whether they are to be handled by BM or KT treatment at search time. This changes the rule base to look like that shown in FIG. 8C, where the rule base contains KT results for strings that will be handled by the KT process described herein, as well as encoded strings in the BM pattern information that will be used in real-time when performing a BM search, along with the CC table and state-transition table, as described herein.

7. Object Model

In accordance with the present methods and systems, an object-oriented programming approach may be used, in accordance with which certain programming objects may be implemented. As an example, once the state machine has been generated from the regex, that state machine may be stored in memory or other data storage in the form of a state-transition table. As such, each state in the state machine may be implemented as an instance of a programming object referred to herein as a "State," while a "State Graph" programming object may include a pointer to the initial State (State *initialState) in the machine, along with an integer value corresponding to the number of States in the machine (int stateCount). Conceptually, the State Graph may be thought of as representing the entire state machine, and essentially is a 'container' for the state machine. Thus, the State Graph object may have a structure similar to that shown in the following table.

| State Graph |
| --- |
| // Pointer to the Initial State in the State Machine<br>State *initialState<br>// Count of the Number of States in the State Machine<br>int stateCount |

As described above, each State in the State Graph may be implemented as an instance of the State object. Each State may have a pointer to a linked list of one or more Transition objects (Transition *transitions), representing the one or more egress events to other States in the State Graph. Furthermore, each State may have a Boolean variable that indicates whether that State is an accepting state (i.e. match state) or not (bool isAcceptingState). Each State object may further include an integer variable representing the lambda count for the state, in the case that the State has a lambda egress event (int maxLambdaCount). Furthermore, each State may have an integer variables representing the State's maximum tail length (int maxTailLength) and maximum transition event length (int maxTransitionEventLength), which would be used in the event that the State needed to be paused with saved restart information, as described above. These variables help determine how much data must be kept to be able to restart a search when more data arrives.

Furthermore, each State object may also have certain dynamic search-time values. For example, each State may have a start and end value for a term range (int termRangeStart and int termRangeEnd), along with start and end values for a checked range (int checkedRangeStart and int checkedRangeEnd), to be used in calculating and storing the state ranges described herein. In addition, each state may have an integer state count variable (int count), for use in storing the current number of times that the State has been transitioned into, for use in making lambda-transition determinations, as described herein. As such, a State programming object may have a structure as follows.

| State |
|---|
| // Transitions connect States and define the structure of the state machine<br>Transition *transitions<br>// Static Parameters of the State<br>bool isAcceptingState<br>int maxLambdaCount<br>// Restart Information<br>int maxTailLength<br>int maxTransitionEventLength<br>// Dynamic Search-Time Data<br>int termRangeStart<br>int termRangeEnd<br>int checkedRangeStart<br>int checkedRangeEnd<br>int count |

As shown above, each State object contains a transitions pointer to a linked list of Transition objects. In accordance with the present methods and systems, the Transition object represents transitions between States, and defines the structure of the State Graph (i.e. the state machine). Each instance of the Transition object contains another programming object called an Event (Event event), explained below. And each instance of the Transition object further includes a pointer (State *nextState) to a State object representing the next state in the state machine (i.e. State Graph, state-transition table, etc.). Thus, the Transition object may have a structure as follows.

| Transition |
|---|
| // An event associated with the particular transition<br>Event event<br>// A pointer to the next state, thus defining the structure of the State Graph<br>State *nextState |

As referenced above, each Transition in the object model has an associated Event. As further explained herein, there are different types of transitions in accordance with the present systems and methods. As such, there are different types of Events. The Event object includes an a value corresponding to an event type (EventType type), which may be implemented in the software as an enumerated type, along with an integer parameter used as an event identifier (int eventId).

The EventType may be one of the following: character class, string, anchor, Lambda1, or Lambda2, corresponding to different types of transitions described herein. The eventId takes on different meanings depending upon the value of the event type. If the event is a character class or string, the eventId may correspond to an element in a stored CC table or keyword tree, as described herein. If the event is an anchor, the eventId may indicate whether the anchor is a start anchor or an end anchor. Finally, if the event is a Lambda1 or Lambda2, the eventId may represent the lambda threshold associated with the transition, for comparison with the running state count in evaluating the lambda threshold condition. Thus, the Event object may have a structure as follows.

| Event |
|---|
| // Indicates whether the event is CC, String, Anchor, Lambda1, or Lambda2<br>EventType type<br>// Takes on different significance depending on the type of event<br>int eventId |

8. Applications

As described herein, the present methods and systems relate to processing data subjects to identify therein the presence of predetermined data patterns, such as can be expressed using regular expressions. As also described herein, one application in which the present methods and systems may be applied is in intrusion-prevention and intrusion-detection systems. In that context, once a particular subject (e.g. payload of one or more packets) has been identified as matching a particular regex (e.g. an attack signature), a number of different actions may be taken with respect to that packet or those packets, such as quarantining them, discarding them, deleting them, saving them, notifying a user (e.g. a network administrator) in real-time and/or in a stored report, and/or any other suitable action.

A somewhat related context in which the present methods and systems may be applied is scanning a particular file, volume, directory, disk, etc. on a particular computer or group of computers. Thus, in addition to scanning flowing network traffic, data that is not being transferred at the time can be scanned as well for particular signature patterns that may indicate a virus, spyware, and/or any other threat. In this context, upon detecting a match, some similar actions may be taken with respect to particular files, directories, etc., such as quarantining, deleting, notifying a user of the event, prompting a user to determine a next action, and/or any other suitable manner of dealing with an identified actual or potential threat.

Another context in which the present methods and systems may prove useful is the context often known as "extrusion prevention," which relates to attempting to prevent certain types of information from being transferred from a particular computer, group of computers, network, server. This may include preventing extrusions caused by hackers, for example, as well as extrusions sent from within, such as by a disloyal employee, for example. Upon detection of such an extrusion, a particular transfer or flow could be stopped, the person or persons causing the extrusion could be identified in a report, a network administrator could be alerted, etc.

An additional context in which the present methods and systems may be applied is the context often known as deep packet inspection (DPI), which generally refers to examining packets at higher layers of the Open Systems Interconnection (OSI) reference model, such as the application layer, the presentation layer, the session layer, etc. DPI is often done in real-time by a device such as a network switch or router. The particular patterns being searched for may be related to the type of data, the application being used by an end user, a type of data such as streaming video, a particular source such as a particular website, etc.

Upon detection of a match, any number of responsive actions could be taken, including logging a particular flow (also known as "packet capture") to save for later inspection, directing a flow to a particular decoder or processing engine as appropriate, intercepting web-based e-mail associated with a particular provider, extracting content, identifying packet types or users, identifying applications (peer to peer, VoIP), throttling (i.e. rate limiting) the data packets (QOS), monitoring outbound traffic, and/or any other action. An additional action that may be taken upon identifying a matching pattern in a packet or set of packets may be to route a copy of one or more packets to an authorized law-enforcement agency.

Another context in which the present methods and systems may be applied is the context of searching a particular database for particular data patterns, perhaps as requested by users of the database. As an example, an Internet search engine may use the present methods and systems to improve searching for matches to regular expressions (which may be generated from search strings or provided directly by users). Upon finding a match, a list of matching documents may be presented to a user. More generally in the context of database searching, the present methods and systems may be used for data mining, to sift through a database and perhaps highlight correlations of significance, create reports indicating data-mining results, etc.

Another context in which the present methods and systems may be applied is the context of a text editor and/or word processor. Upon finding a match in a document or set of documents, matches may be highlighted for a user, who may then be able to iterate through the matches using a "next match" command on a user interface of the text editor or word processor. Furthermore, a report of matches may be produced for a user. As another option, a search-and-replace operation may be carried out, thereby changing the contents of one or more documents according to a set of matching locations identified using the present methods and systems.

As another example, in the context of bioinformatics, the present methods and systems may be used to search for particular gene markers in DNA, where the gene markers are set forth in a regular expression. As in other contexts, a list of matching locations could be presented to a user for further processing.

9. Exemplary Operation

Figure 9:
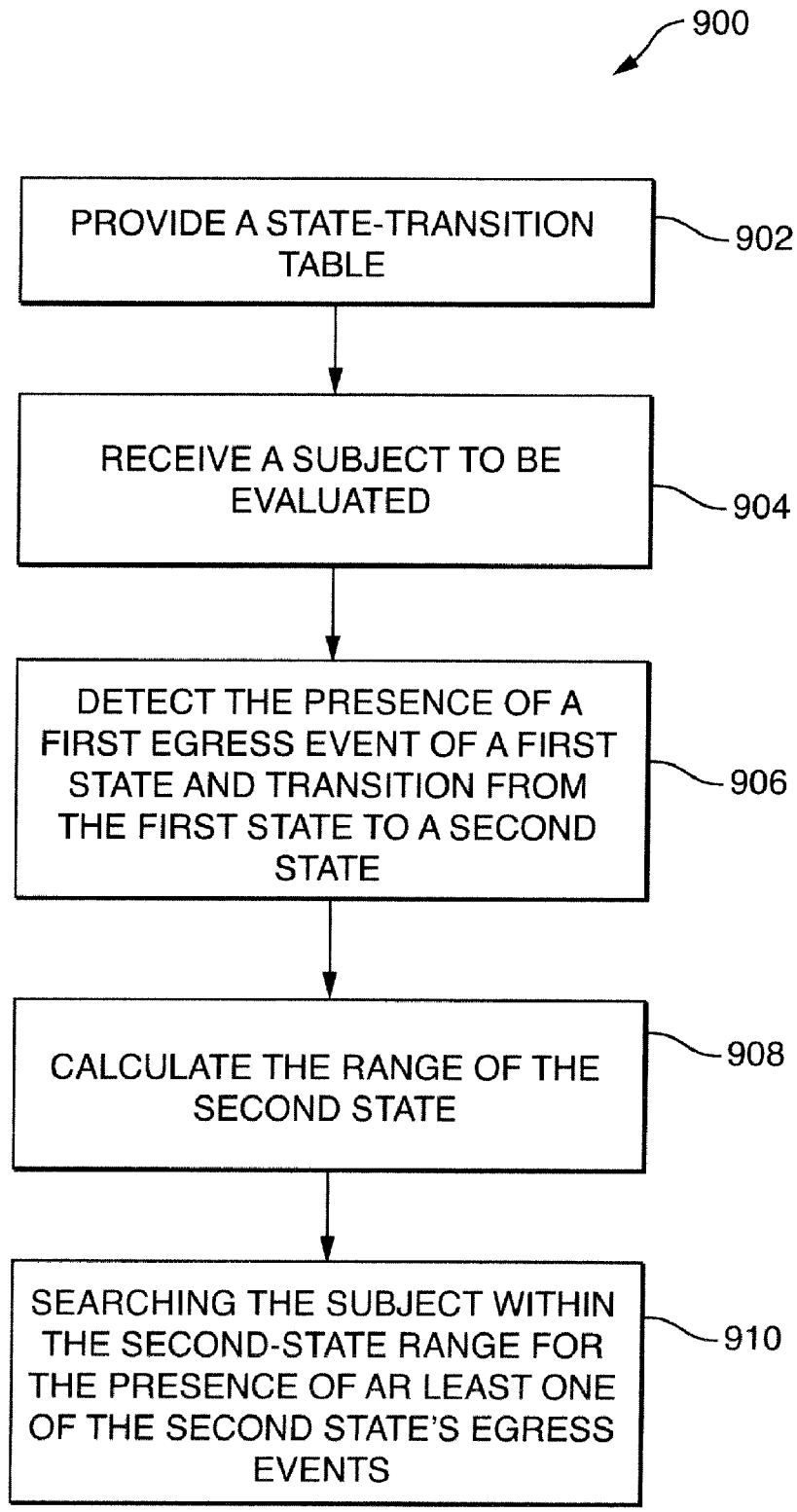
FIG. 9 is a flow chart depicting an example of a method.

FIG. 9 depicts an exemplary method 900, which may be carried out in an intrusion-prevention system for examining network traffic and identifying therein the presence of signature data patterns. In accordance with the method, at 902, a state-transition table is provided. The state-transition table is representative of a predetermined data pattern, and comprises a plurality of states, each state having a set of egress events, each egress event defining a transition from a current state to a next state.

The state-transition table may be representative of a state diagram that itself is representative of the predetermined data pattern. The predetermined data pattern may be representative of a regular expression. Furthermore, each egress event may be either a character class or a character string.

Further in accordance with the exemplary method, at 904, a subject is received, where the subject is to be evaluated for the presence of the predetermined data pattern. The subject may comprise a payload of one or more packets, and the presence of the predetermined data pattern may be indicative of a potential security threat.

At 906, while using the state-transition table to evaluate the subject for the presence of the predetermined data pattern, the presence of a first egress event of a first state is detected in the subject. The first egress event defines a transition from the first state to a second state, and the presence of the first egress event in the subject results in transitioning from the first state to the second state. Transitioning from one state to another may involve recursively calling a state-search function. In one embodiment, the state-search function may be implemented in a manner similar to that expressed in the following pseudocode.

```
Status searchFunction( prevState, ingressEvent, currentState, subject,
subjectLen, cursor )
{
        if( currentState->isAcceptingState ) return MATCH;
        if( can't proceed )
        {
                // At end of subject so nothing left to search
                // State count > lambda condition so transitions out no
                    longer possible?
                Return NO_MATCH;
        }
        currentState->count++;
        computeCheckedRange(prevState, ingressEvent, currentState,
                            subject, subjectLen, cursor );
    for( each transition from currentState )
    {
    nextState = transition->nextState;
    if( transition->event->type == STRING MATCH EVENT )
    {
            for( each string match in currentState's check range )
            {
                    // Find position after sting match
                    nextCursor = stringMatchPosition + stringLen;
                    result = search Function(currentState,
                                        transition->eyent,
                                        transition->nextState,
                                        subject,
                                        subjectLen,
                                        nextCursor );
                    if( result = MATCH) return MATCH;
            }
    }
    else if (transition->event->type == CC_MATCH_EVENT )
    {
            for( index is in checked range, starting at cursor )
            {
                    if( subject[index] matches
                    transition->event->CC )
                    {
                            result = searchFunction( currentState,
                                        transition->event,
                                        transition->nextState,
                                        subject,
                                        subjectLen,
                                        nextCursor );
                            if( result = MATCH) return MATCH;
                            // No need to try nextState again until
                                after it's checked end
                            index = nextState->checkedEnd;
                    }
                    else
                    {
                            // Try the next position
                            index++;
                    }
```

-continued

```
            }
        }
    }
    currentState->count--;
    return NO_MATCH;
}
```

Further in accordance with the exemplary method, at 908, a second-state range is calculated, where the second-state range is a range of positions in the subject in which to search for the presence of at least one of the second state's egress events. A cursor may correspond to a location in the subject that is currently being evaluated. Furthermore, the first state may have an associated first-state range in the subject. And calculating the second-state range may comprise setting a start of the second-state range equal to the cursor; and then, starting at the cursor, and extending no further than an end of the first-state range, determining that the subject includes a number of consecutive instances of the first egress event that end at a first position in the subject; and setting an end of the second-state range based on the first position. Furthermore, it may be determined that the second state does not have a character-class loop transition. In some embodiments, the first-state range may be calculated.

Alternatively, calculating the second-state range may comprise determining that the second state has a character-class loop transition; setting a start of the second-state range equal to the cursor; and then, starting at the cursor, determining that the subject includes a number of consecutive characters that satisfy the character-class loop transition and that end at a first position in the subject; and setting an end of the second-state range based on the first position.

In accordance with the exemplary method, at 910, the subject is then searched within the second-state range for the presence of at least one of the second state's egress events. This may involve sequentially searching the subject within the second-state range for the presence of each of the second state's egress events, and, when the presence of such an egress event is found, responsively transitioning from the second state to that egress event's next state. This transition may also involve recursively calling a state-search function.

The method may further comprise determining that none of the second state's egress events are present in the subject within the second-state range, and responsively returning to the first state. Upon returning to the first state, the cursor may be advanced to the end of the second-state range. The subject may then be searched after the advanced cursor and within the first-state range for the presence of at least one of the first state's egress events.

In another aspect, an exemplary embodiment may take the form of an intrusion-prevention network device for examining network traffic and identifying therein the presence of signature data patterns. The network device comprises a network interface, a processor, and data storage. The data storage comprises a state-transition table representative of a predetermined data pattern, the state-transition table comprising a plurality of states, each state having a set of egress events, each egress event defining a transition from a current state to a next state. The data storage further comprises instructions executable by the processor to carry out the methods described herein, in any suitable combinations and permutations.

Figure 10:
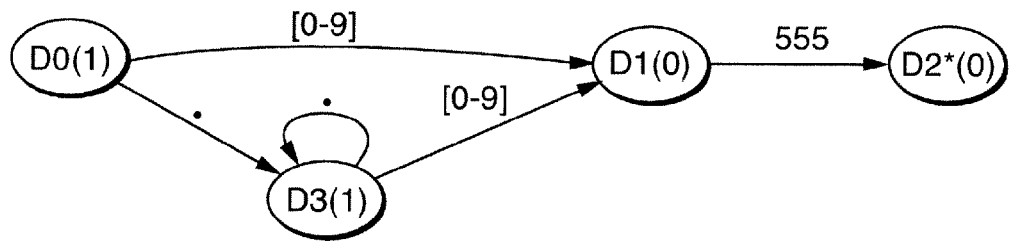
FIG. 10 shows examples of regex processing.
Figure 11:
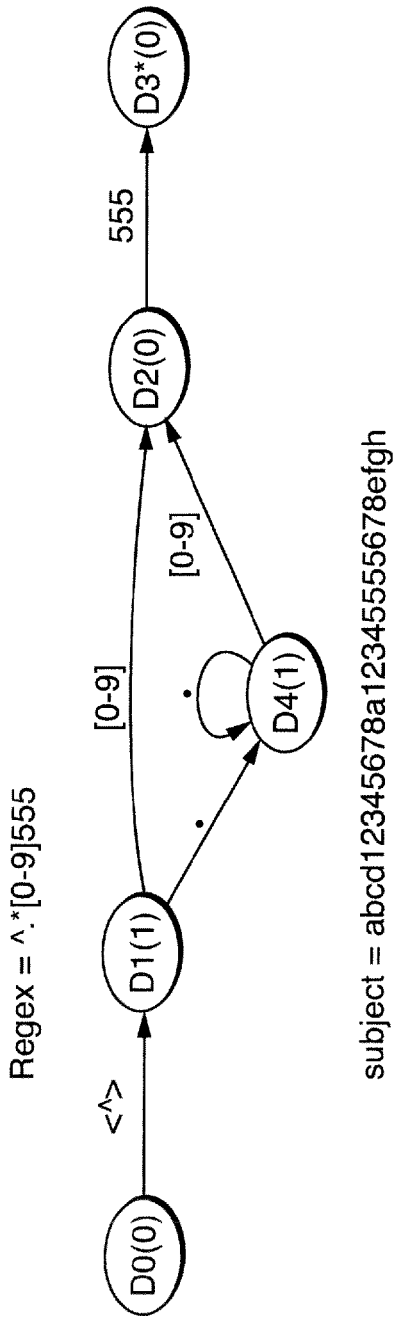
FIG. 11 shows examples of regex processing.

Finally, note that FIG. 10 depicts two examples in accordance with the present methods and systems. In particular, an exemplary regex and the state machine generated therefrom are depicted. Furthermore, two examples are depicted, using two slightly different subjects to be processed. A state-by-state trace of what state the processing is in, along with the checked range calculated for the respective state at the time, are shown in the examples as well. And additional examples are provided in FIG. 11.

Exemplary embodiments of the invention have been described above. Those skilled in the art will appreciate that changes may be made to the embodiment described without departing from the true spirit and scope of the invention as defined by the claims.

The invention claimed is:

1. In an intrusion-prevention system for examining network traffic and identifying therein the presence of signature data patterns, a method comprising:
    providing a state-transition table representative of a predetermined data pattern, the state-transition table comprising a plurality of states, each state having a set of egress events, each egress event defining a transition from a current state to a next state;
    receiving a subject to be evaluated for the presence of the predetermined data pattern;
    while using the state-transition table to evaluate the subject for the presence of the predetermined data pattern, detecting in the subject the presence of a first egress event of a first state, the first egress event defining a transition from the first state to a second state, and responsively transitioning from the first state to the second state;
    calculating, by a processor, a second-state range, the second-state range being a range of positions in the subject in which to search for the presence of at least one of the second state's egress events; and
    searching, by the processor, the subject within the second-state range for the presence of at least one of the second state's egress events.

2. The method of claim 1, wherein the state-transition table is representative of a state diagram, the state diagram representative of the predetermined data pattern.

3. The method of claim 1, wherein the predetermined data pattern is representative of a regular expression.

4. The method of claim 1, wherein each egress event is either a character class or a character string.

5. The method of claim 1, wherein the subject comprises a payload of one or more packets.

6. The method of claim 1, wherein the presence of the predetermined data pattern is indicative of a potential security threat.

7. The method of claim 1, wherein a cursor corresponds to a location in the subject that is currently being evaluated.

8. The method of claim 7, wherein the first state has an associated first-state range in the subject, and wherein calculating the second-state range comprises:
    setting a start of the second-state range equal to the cursor;
    starting at the cursor, and extending no further than an end of the first-state range, determining that the subject includes a number of consecutive instances of the first egress event, the consecutive instances ending at a first position in the subject; and
    setting an end of the second-state range based on the first position.

9. The method of claim 8, further comprising determining that the second state does not have a character-class loop transition.

10. The method of claim 8, further comprising calculating the first-state range.

11. The method of claim 7, wherein calculating the second-state range comprises:
  determining that the second state has a character-class loop transition;
  setting a start of the second-state range equal to the cursor;
  starting at the cursor, determining that the subject includes a number of consecutive characters that satisfy the character-class loop transition, the consecutive instances ending at a first position in the subject; and
  setting an end of the second-state range based on the first position.

12. The method of claim 7, wherein the first state has an associated first-state range in the subject, the method further comprising:
  determining that none of the second state's egress events are present in the subject within the second-state range, and responsively returning to the first state; and
  upon returning to the first state, advancing the cursor to an end of the second-state range; and
  searching the subject after the advanced cursor and within the first-state range for the presence of at least one of the first state's egress events.

13. The method of claim 1, wherein searching the subject within the second-state range for the presence of at least one of the second state's egress events comprises:
  sequentially searching the subject within the second-state range for the presence of each of the second state's egress events, and, when the presence of such an egress event is found, responsively transitioning from the second state to that egress event's next state.

14. The method of claim 13, wherein transitioning from one state to another state comprises recursively calling a state-search function.

15. The method of claim 1, wherein transitioning from one state to another state comprises recursively calling a state-search function.

16. An intrusion-prevention network device for examining network traffic and identifying therein the presence of signature data patterns, the network device comprising:
  a network interface;
  a processor; and
  data storage comprising:
    a state-transition table representative of a predetermined data pattern, the state-transition table comprising a plurality of states, each state having a set of egress events, each egress event defining a transition from a current state to a next state; and
    instructions executable by the processor to:
      receive a subject to be evaluated for the presence of the predetermined data pattern;
      while using the state-transition table to evaluate the subject for the presence of the predetermined data pattern, detect in the subject the presence of a first egress event of a first state, the first egress event defining a transition from the first state to a second state, and responsively transition from the first state to the second state;
      calculate a second-state range, the second-state range being a range of positions in the subject in which to search for the presence of at least one of the second state's egress events; and
      search the subject within the second-state range for the presence of at least one of the second state's egress events.

17. The intrusion-prevention network device of claim 16, wherein the first state has an associated first-state range in the subject, and wherein the data storage further comprises instructions executable by the processor to:
  set a start of the second-state range equal to the cursor;
  start at the cursor, and extending no further than an end of the first-state range, determining that the subject includes a number of consecutive instances of the first egress event, the consecutive instances ending at a first position in the subject; and
  set an end of the second-state range based on the first position to calculate the second-state range.

18. A non-transitory computer readable storage medium on which is embedded a computer program, said computer program implementing a method examining network traffic and identifying therein the presence of signature data patterns, said computer program comprising a set of instructions to:
  provide a state-transition table representative of a predetermined data pattern, the state-transition table comprising a plurality of states, each state having a set of egress events, each egress event defining a transition from a current state to a next state;
  receive a subject to be evaluated for the presence of the predetermined data pattern;
  while using the state-transition table to evaluate the subject for the presence of the predetermined data pattern, detect in the subject the presence of a first egress event of a first state, the first egress event defining a transition from the first state to a second state, and responsively transition from the first state to the second state;
  calculate a second-state range, the second-state range being a range of positions in the subject in which to search for the presence of at least one of the second state's egress events; and
  search the subject within the second-state range for the presence of at least one of the second state's egress events.

19. The non-transitory computer readable storage medium of claim 18, wherein the first state has an associated first-state range in the subject, said computer program comprises a further set of instructions to:
  set a start of the second-state range equal to the cursor;
  start at the cursor, and extending no further than an end of the first-state range, determining that the subject includes a number of consecutive instances of the first egress event, the consecutive instances ending at a first position in the subject; and
  set an end of the second-state range based on the first position to calculate the second-state range.

20. The non-transitory computer readable storage medium of claim 18, said computer program comprises a further set of instructions to:
  determine that the second state has a character-class loop transition;
  set a start of the second-state range equal to the cursor;
  start at the cursor, determining that the subject includes a number of consecutive characters that satisfy the character-class loop transition, the consecutive instances ending at a first position in the subject; and
  set an end of the second-state range based on the first position to calculate the second-state range.

* * * * *